June 23, 1931.  P. B. VALLÉ  1,811,067
CONDENSER AND METHOD OF MAKING SAME
Filed June 25, 1927

Inventor
Paul B. Vallé
By Rockwell & Bartholow
Attorneys

Patented June 23, 1931

1,811,067

UNITED STATES PATENT OFFICE

PAUL B. VALLÉ, OF NEW HAVEN, CONNECTICUT

CONDENSER AND METHOD OF MAKING SAME

Application filed June 25, 1927. Serial No. 201,466.

This invention relates to electrical condensers, and more especially to those condensers comprising a cartridge consisting of windings of conducting material separated by an insulator and impregnated with wax or like material forming a compact structure which may be inserted into a covering or case.

Condensers of this type are usually made by winding upon a mandrel alternate strips of insulating material, such as paper, for instance, and conducting material, the latter usually being aluminum. Terminals are brought out from the conducting strips so that connections to the conductor may be readily made. These condensor windings are, when completed, removed from the mandrel and are usually placed in a bath of some impregnating substance, usually an insulating wax, where the cartridge is thoroughly impregnated either by means of a vacuum or pressure, or sometimes by maintaining the bath at a high temperature. These expedients serve to drive off the air and moisture in the insulating material of the condenser so that it will become saturated with the impregnating material.

The impregnated cartridges, while still hot, are then either placed in a mold or between flat plates and put under pressure so that the excess wax or other impregnating material is squeezed out, and the cartridge takes the form of the mold or is flattened out in the press. It is then allowed to cool under pressure in the mold or press, and, when the wax has sufficiently solidified, the cartridges are removed, the latter being relatively firm and hard so that their shape will be maintained and so that the conducting strips will be kept as close together as possible, the distance between them, of course, being limited by the insulating strips.

This completed cartridge is then usually placed in a container, generally made of metal. The cartridge must, of course, be well insulated from the container; and a cover is provided for the latter to seal the condenser from air and moisture and to hold it firmly in the case. When the case is made of metal, it must be painted or treated in some way to prevent corrosion, which is quite apt to occur.

A condenser of the general form described above is subject to certain disadvantages, and, owing to the fact that a good deal of hand labor is required in assembling the cartridges in the containers in the proper manner, is relatively expensive. Some of the disadvantages arise from the fact that air and moisture sometimes get between the plates into the insulating material after the condenser is impregnated and cause its deterioration. Moreover, the conducting plates of the condenser often tend to separate or spread apart after a period of time and the electrostatic capacity of the condenser therefore varies, as this capacity varies with the distance between the plates.

In addition, on account of the fact that the metal case must be somewhat larger than the condenser cartridge, both for ease in assembly and to prevent damage to the cartridge during the assembly process, there can be little, if any, useful mechanical pressure of the case against the cartridge to hold the latter in shape. The adhesiveness and hardness of the wax must be depended upon for this function; and for this reason a wax with a relatively high softening point is required, so that the room temperature or the heat developed in the condenser or both will not soften the wax or other impregnating material and thus allow the coils of the cartridge to open up, which would result in a variation of the condenser capacity and also the penetration of air and moisture, which would cause the condenser to deteriorate. This high melting point wax is considerably more expensive than a low melting point wax, and also, in general, is of a lower dielectric strength than a pure wax having a lower melting point.

I propose, therefore, to provide a case or container for a condenser, which will be formed of an insulating and non-corroding material and which may be applied to the condenser cartridge in such a manner that it will exert a considerable pressure thereon to maintain the cartridge in its original shape and prevent any tendency of the coils or windings to open up and thus preserve constant the capacity of the condenser.

One object of my invention, therefore, is to provide a new and improved case for container for an electrical condenser.

Another object of the invention is to provide a condenser case formed of a moldable material, which will have the property of becoming somewhat plastic when subjected to a temperature above the normal and shall contract on cooling so that the condenser cartridge may be placed in the case while in plastic condition, and when the assembled unit is allowed to cool the case will exert considerable pressure on the cartridge.

Another object of this invention is to provide an improved condenser case which shall have good dielectric strength and shall be of non-corroding material and which, at the same time, may be applied to the condenser in a way to exert considerable mechanical pressure thereon.

A still further object of the invention is to provide a condenser consisting of the usual condenser cartridge and case, which may be assembled economically and readily and which will, at the same time, not deteriorate in use and will not be subject to variation in respect to its electrical capacity.

To these and other ends, the invention consists in the novel method features and combinations of parts to be hereinafter described and claimed.

Figure 1:
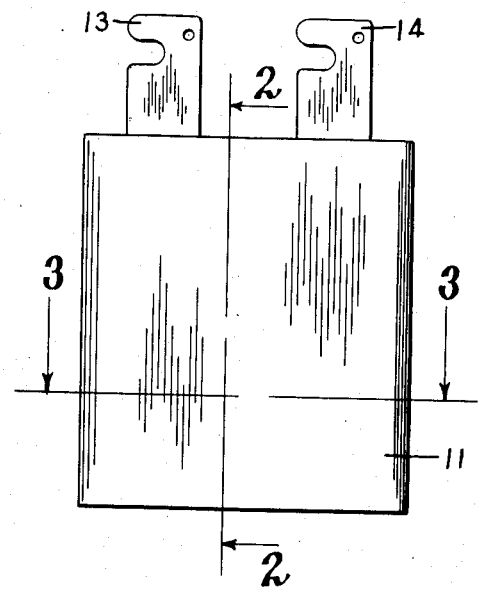
Fig. 1 is a side elevational view of a condenser embodying my invention.

The condenser unit which I have selected to illustrate and describe comprises a cartridge 10 encased within a container or casing 11, provided with a cover 12, through which project the condenser terminals 13 and 14.

The cartridge 10 as shown consists of a number of windings of conducting strips spaced by strips of insulating material of the usual form. I may, for instance, and preferably will, use a conducting strip of aluminum and an insulating strip of paper, although it will be understood that other materials may be employed. For instance, the insulating material might be sheets of rubber, celluloid, or mica, or, in fact, any form of sheet insulating material. The alternate strips of insulating and conducting material are wound spirally upon a mandrel, the terminals being brought out from the conducting strips to be eventually connected to the condenser terminals 13 and 14, which will protrude from the case. The windings are then removed from the mandrel and placed in a bath of impregnating material. This material is preferably wax having a relatively low melting point, but other impregnating materials may be used, such as paraffin, petrolatum, or insulating oil, since the material of which I propose to make the container may be compounded to resist the action of any of these materials. The cartridge is then pressed or molded into the desired shape and allowed to cool.

The container or case 11 is preferably made of hard rubber, as it is advantageous that it be made of a moldable material of good dielectric strength and having the property of becoming somewhat plastic when heated say to a temperature of 200° Fahrenheit and of shrinking upon cooling more than it expands upon being heated. Hard rubber possesses these properties, and as it is a good insulator and is not subject to corrosion, it is entirely suitable for this purpose.

The container is formed or molded so that its inside cross-sectional dimensions shall be substantially the same as the corresponding outside dimensions of the cartridge. Due to the fact that upon being heated the case will expand slightly, it may be made slightly smaller than the cartridge.

The container may then be heated to a point where the material of which it is made is slightly plastic, and the condenser cartridge may then be inserted or forced thereinto if the container is of such size that some force may be needed, notwithstanding the fact that the heating has been accompanied by a certain amount of expansion. Due to its plastic condition the container may, of course, conform to any slight irregularities in size or shape of the cartridge.

The case or container is then covered in some manner, and the terminals, which are secured to the condenser windings, are brought through the cover. The cover may be of any suitable material, preferably an insulating material. It may, of course, be made of hard rubber like the container itself. In such case, it may be formed to fit tightly within the container so that when the latter cools the cover would be tightly held in place, and thus provide an air-tight seal which would prevent the entrance of air or moisture to the cartridge. I may, of course, provide a cover of wax or the like and in this case a high melting point wax may be used, as such a wax will adhere to the plastic material of the case and provide an air-tight covering for such a case, which would not be successfully effected if the case or container were made of metal.

After the cover has been placed on the case, the assembled unit, consisting of the condenser cartridge and case, is allowed to cool. Due to the property of the plastic material, from which the case is made, of contracting upon being cooled, and particularly due to the property possessed by hard rubber of contracting upon cooling more than it expands upon being heated, the container will, upon cooling, shrink tightly around the condenser and exert a considerable mechanical pressure thereon so as to exclude all air and moisture from the cartridge, and maintain a substantially constant electrostatic capacity. This pressure exerted by the container will prevent any tendency of the windings of the cartridge to open up, which is objectionable both from the standpoint of the variation of the electrostatic capacity and because of the consequent admission of air and moisture.

Regardless of the material which may be used to make the condenser case, it will be apparent that by my improved method of covering the condenser cartridge by shrinking the case thereupon, I provide for the exertion of a continuous pressure upon the condenser which, as already explained, is very advantageous. It is also quite advantageous to provide a case of non-corroding insulating material which shall have the property of becoming somewhat plastic upon being heated so that a good fit may be made between the cartridge and the case. It will be apparent that all of these advantages are combined in the condenser unit illustrated.

Figure 2:
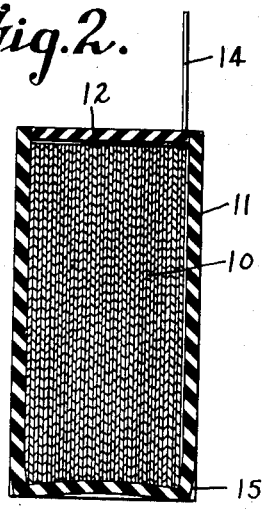
Fig. 2 is a sectional view on the line 2—2 of Fig. 1.
Figure 3:
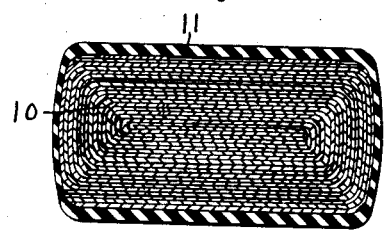
Fig. 3 is a sectional view on the line 3—3 of Fig. 1.

When the cartridge is placed in the container the wall of the latter may be displaced inwardly slightly as shown at 15 on Fig. 2, so that the cartridge will be positively gripped by the case and be held securely in place.

Figure 4:
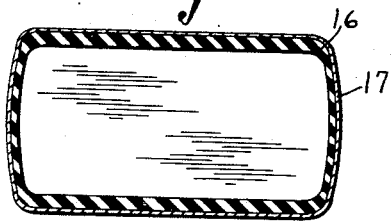
Fig. 4 is a sectional view of a condenser case of somewhat modified form.

In certain installations in which a condenser is used it is preferred that the condenser be shielded. This can readily be done as shown in connection with the condenser case which I have illustrated in Fig. 4, where the case 16 is provided with a covering of metal foil or metal paint 17. This foil or paint may be placed upon the inside instead of the outside of the case if preferred. A terminal may be attached to this shield so that it may be grounded in the usual way.

As the temperature necessary to cure hard rubber is below the carbonization point of paper impregnated with wax it is also safe and practical to mould a rubber case around the condenser cartridge instead of forming the case separately, and thereafter placing the condenser therein.

Due to the fact that the container is of insulating material no accessory insulation is needed between the container and the condenser cartridge, and at the same time the danger of any short-circuiting between the condenser and the case is entirely eliminated. Moreover there is a great saving in assembly cost in that as the cartridge fits tightly into the case no packing or other means is necessary to hold it firmly in place, so that the labor in assembling the parts is greatly reduced, resulting in a considerable saving in this respect, as well as in the materials used. In some instances where a metallic case is used, it has been necessary to pour wax about the cartridge in order to hold the latter mechanically rigid within the case. This, of course, is not necessary in a condenser made according to my invention. Another source of economy is in the fact that a low melting point wax may be used as has already been explained, which is much less costly than the high melting point wax.

Alternatively the case may be separately moulded and cured only to a partial extent before the cartridge is placed therein. The cartridge could then be inserted in the case and the cure carried to completion either in the ordinary vulcanizer in which case the cartridge will have previously been impregnated with wax, or the curing process may be completed in a bath of hot wax which can be safely brought to a temperature which would vulcanize the semi-cured case and simultaneously effect the impregnation of the cartridge. When the vulcanization of a semi-cured case is completed, it of course causes a very appreciable contraction of the case greater than that which would be caused if a fully cured case is merely heated and allowed to cool again.

When the cartridge is placed in a cured case which has been rendered semi-plastic by the application of heat, or when it is placed in a semi-cured case, I may apply a continuous mechanical pressure upon the case while it is being allowed to cool. As a result, on account of the pressure exerted upon the case during the cure or the cooling, it will conform to the shape of the condenser cartridge exactly and rigidly, and, moreover, will assure a minimum distance between the conducting plates of the condenser. The mechanical pressure will of course be aided by the natural contraction of the material of which the case is made, either in the case of the plastic fully cured case or the semi-cured case, but it is primarily the mechanical pressure which causes the case to conform to the cartridge, and the subsequent contraction, due to the cooling, maintains the pressure uniformly on the condenser cartridge, and even increases it to a certain extent. This mechanical pressure on the exterior of the case may be obtained, for instance, by placing the case in a suitable press during the cooling process.

Also, the cover may be formed to fit tightly into the mouth of the case and mechanical pressure brought to bear upon the case rim while it is in a semi-plastic condition in such a way as to grip the cover tightly and provide an air-tight seal. A cover may of course be applied to the case at the time the condenser is placed therein, and the unit then placed in the press which may be provided with dies, or other suitable forming equipment, so that the cover will be tightly joined to the case at the same time that mechanical pressure is brought to bear on the assembled unit.

While I have shown some preferred forms of my invention and preferred methods carrying it into effect, it will be understood that it is not limited to all the details shown or the exact steps described, but is capable of modification and variation within the spirit of the invention and within the scope of the appended claims.

What I claim is:

1. The method of making an electrical condenser which comprises forming a condenser cartridge consisting of alternate wrappings of insulating and conducting material, forming a casing of a moldable dielectric material having the property of becoming plastic when heated, inserting the cartridge into the case when the latter is in plastic condition, and cooling the assembled unit to cause the case to be shrunk upon the cartridge and exert a mechanical pressure thereon.

2. An electrical condenser comprising a condenser cartridge and a preformed casing shrunk thereon so as to exert mechanical pressure on the cartridge.

3. An electrical condenser comprising a cartridge and a unitary preformed casing of a moldable dielectric material in which said cartridge is inserted, said casing exerting a continuous mechanical pressure upon the cartridge to hold it in compact form, and a cover sealing said casing against the entrance of air.

4. A condenser cartridge comprising alternate strips of conducting and insulating material and a one-piece preformed container encasing said cartridge and exerting pressure thereon directly against the exterior of the cartridge to hold the strips in compact relation.

5. An electrical condenser comprising a condenser cartridge and a preformed casing of a moldable material shrunk upon said cartridge and exerting continuous mechanical pressure directly thereon, said casing having an opening through which the cartridge is inserted.

6. An electrical condenser comprising a cartridge and a case and cover for said cartridge formed of a moldable dielectric material and a metallic shield covering the walls of the case and cover.

7. The method of making a condenser unit comprising a cartridge and a case, which comprises forming the condenser cartridge, forming a case of hard rubber or the like in semi-cured condition, inserting the condenser in the case, and thereafter carrying the cure of the material of the case to completion.

8. The method of making a condenser unit, comprising a cartridge and a case, which comprises forming the condenser cartridge, forming a case of hard rubber or the like in semi-cured condition, inserting the condenser in the case, and thereafter carrying the cure of the material of the case to completion, and impregnating the cartridge with wax or the like simultaneously with the completion of the cure.

9. The method of making an electric condenser which comprises forming a condenser cartridge, providing a container therefor of a moldable dielectric material having the property of contracting on being cooled more than it expands upon being heated, inserting the cartridge into the container when the latter is in heated condition and then cooling the assembled unit to cause the container to be shrunk upon the cartridge and exert a mechanical pressure thereon.

In witness whereof, I have hereunto set my hand this 24th day of June, 1927.

PAUL B. VALLÉ.